(12) United States Patent
Imai et al.

(10) Patent No.: US 12,012,889 B2
(45) Date of Patent: Jun. 18, 2024

(54) TURBOCHARGER

(71) Applicant: Nissan Motor Co., Ltd., Yokohama (JP)

(72) Inventors: Daisuke Imai, Kanagawa (JP); Naozumi Katou, Kanagawa (JP); Tsubasa Endo, Kanagawa (JP); Masashi Morikawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/257,598

(22) PCT Filed: Dec. 18, 2020

(86) PCT No.: PCT/JP2020/047408
§ 371 (c)(1),
(2) Date: Jun. 15, 2023

(87) PCT Pub. No.: WO2022/130615
PCT Pub. Date: Jun. 23, 2022

(65) Prior Publication Data
US 2024/0035413 A1    Feb. 1, 2024

(51) Int. Cl.
*F02B 37/18*    (2006.01)
*F04D 17/10*    (2006.01)
(Continued)

(52) U.S. Cl.
CPC ............ *F02B 37/186* (2013.01); *F04D 17/10* (2013.01); *F04D 27/0215* (2013.01); *F04D 29/4206* (2013.01)

(58) Field of Classification Search
CPC ........ F02B 37/18; F02B 37/24; F02B 37/183; F02B 37/186; F02B 37/16; F04D 17/10;
(Continued)

(56) References Cited

U.S. PATENT DOCUMENTS 9,464,565 B2 * 10/2016 Yamaguchi ........... F02B 37/186
10,487,725 B2 * 11/2019 Takahashi ............. F02B 37/186
(Continued)

FOREIGN PATENT DOCUMENTS

| JP | 2014-58894 A | 4/2014 |
| JP | 2015-537157 A | 12/2015 |
| WO | 2016/031566 A1 | 3/2016 |

OTHER PUBLICATIONS

Extended European Search Report of Dec. 4, 2023 of corresponding European Patent Application No. 209660022.6.

*Primary Examiner* — David E Sosnowski
*Assistant Examiner* — Maxime M Adjagbe
(74) *Attorney, Agent, or Firm* — Global IP Counselors, LLP

(57) ABSTRACT

A turbine housing has a scroll part, an outlet pipe, and an inlet pipe. A bypass passage is formed on an inner peripheral side of a twisting form leading from the inlet pipe toward the scroll part so as to allow communication between an inlet passage and an outlet passage. Viewing the turbine housing in an axial direction, an opening center of an outlet opening of the bypass passage is located in a quadrant where a mounting flange is located among four quadrants defined by a first imaginary plane that passes through a rotational center and that is parallel to a surface of the mounting flange, and a second imaginary plane that passes through the rotational center and that is orthogonal to the first imaginary plane.

4 Claims, 6 Drawing Sheets

(51) Int. Cl.
*F04D 27/02* (2006.01)
*F04D 29/42* (2006.01)

(58) Field of Classification Search
CPC ............... F04D 17/105; F04D 29/4206; F05D 2220/40; F02D 41/0007
See application file for complete search history.

(56) References Cited

U.S. PATENT DOCUMENTS

| | | |
|---|---|---|
| 10,513,974 B2 * | 12/2019 | Uneura .................... F02B 37/18 |
| 2014/0366530 A1 * | 12/2014 | Murayama ............ F02B 37/183 60/602 |
| 2015/0226110 A1 | 8/2015 | Wang et al. |
| 2018/0045104 A1 * | 2/2018 | Ali Khan ............... F02B 37/183 |
| 2018/0328270 A1 * | 11/2018 | Chatzakis ............. F02B 37/183 |
| 2019/0234428 A1 * | 8/2019 | Zhao .................... F04D 29/4213 |

* cited by examiner

TURBOCHARGER

CROSS-REFERENCE TO RELATED APPLICATIONS

This application is a U.S. national stage application of International Application No. PCT/JP2020/047408, filed on Dec. 18, 2020.

BACKGROUND

Technical Field

This invention relates to a turbocharger used for supercharging an internal combustion engine, and particularly relates to improving a turbocharger having a bypass passage and a waste gate valve.

Background Information

A turbocharger used for supercharging an internal combustion engine generally has a bypass passage, which allows part of an exhaust flow to bypass a turbine wheel in order to control boost pressure, and a waste gate valve corresponding to the bypass passage. The waste gate valve generally has a configuration in which an actuator placed outside a housing of the turbocharger drives a valve body to open and close an outlet opening of the bypass passage.

Japanese Laid Open Patent Application No. 2014-58894 A (Patent Document 1) discloses a configuration in which a bypass passage is provided on an outer peripheral side of a twisting form extending from an inlet pipe of a turbine housing to a scroll. When the turbine housing is viewed in an axial direction of a turbocharger, an outlet opening of the bypass passage, which is opened and closed by a valve body of a waste gate valve, is located away from a tip of the inlet pipe serving as an exhaust inlet. Specifically, when imagining a plane that is parallel to a surface of a mounting flange at an end of the inlet pipe and that passes through a center of rotation of the turbocharger, the mounting flange and the outlet opening are located on opposite sides of the imaginary plane.

Such placement is primarily attributable to the constraint that an actuator of the waste gate valve be located outside the turbocharger when the mounting flange at the end of the inlet pipe is mounted on the internal combustion engine.

However, in such a prior-art configuration, the bypass passage cannot be as short as possible as a result, and a temperature of exhaust flowing through the bypass passage is significantly lowered due to heat exchange on an inner wall surface of the bypass passage. Accordingly, there is yet room for improvement in terms of, e.g., catalyst warm-up performance immediately after a cold start.

SUMMARY

In a turbocharger according to this invention: a bypass passage is formed on an inner peripheral side of a twisting form leading from the inlet pipe to a scroll part so as to allow communication between an inlet passage inside an inlet pipe and an outlet passage inside an outlet pipe, a waste gate valve is placed inside the outlet pipe so as to open and close an outlet opening of the bypass passage; and viewing a turbine housing in an axial direction of the turbocharger, an opening center of the outlet opening is located in a quadrant where a mounting flange is located among four quadrants defined by a first imaginary plane that passes through a rotational center of the turbocharger and that is parallel to a surface of the mounting flange, and a second imaginary plane that passes through the rotational center and that is orthogonal to the first imaginary plane.

With such a configuration, a passage length of the bypass passage, which allows communication between the inlet passage inside the inlet pipe and the outlet passage inside the outlet pipe, becomes short, and any drop in temperature of exhaust flowing through the bypass passage is minimized.

BRIEF DESCRIPTION OF THE DRAWINGS

Referring now to the attached drawings which form a part of this original disclosure.

DETAILED DESCRIPTION

An embodiment of this invention is described in detail below with reference to the drawings.

Figure 1:
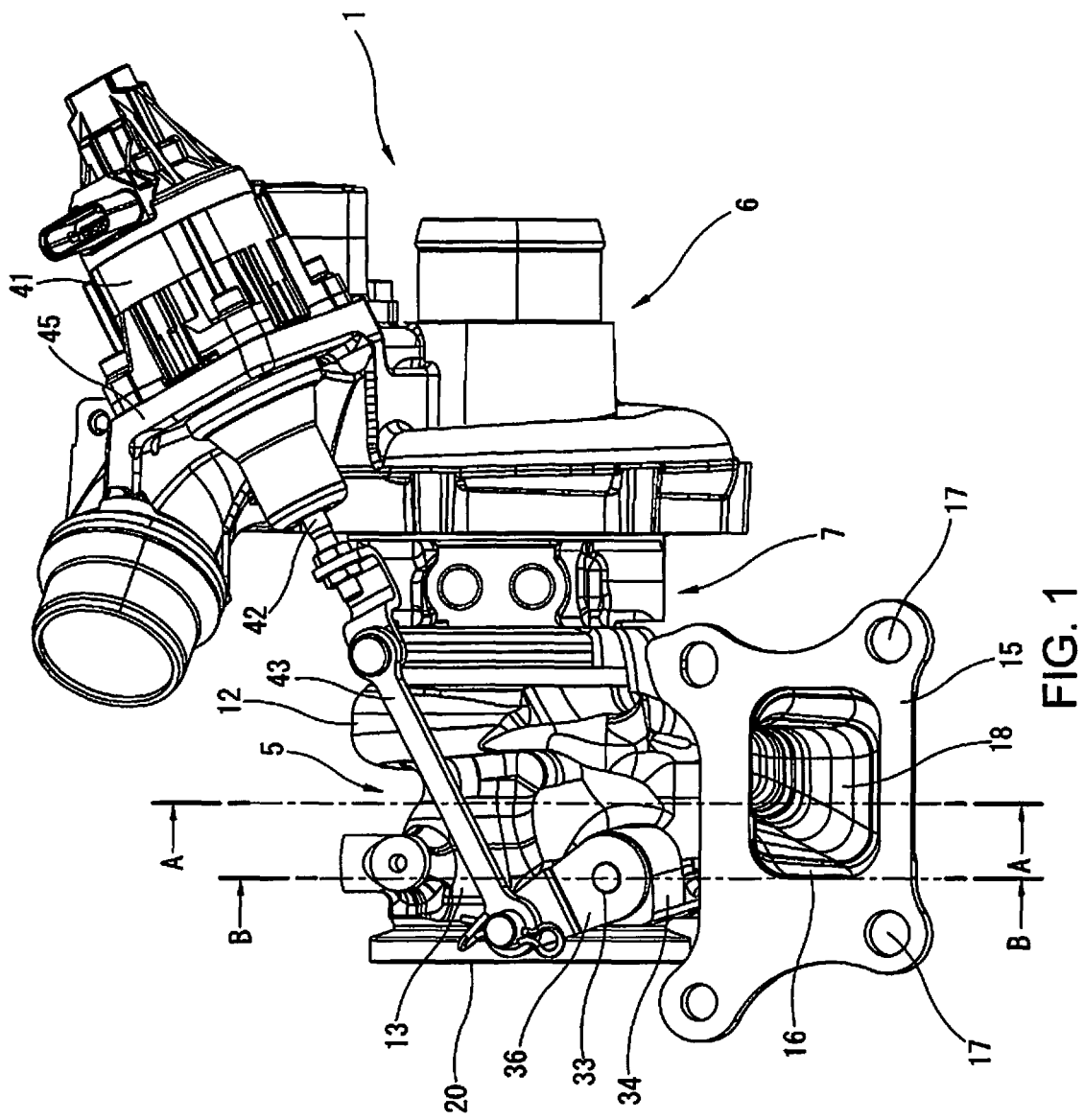
FIG. 1 is a side view of a turbocharger according to the invention as viewed from an internal combustion engine side.
Figure 2:
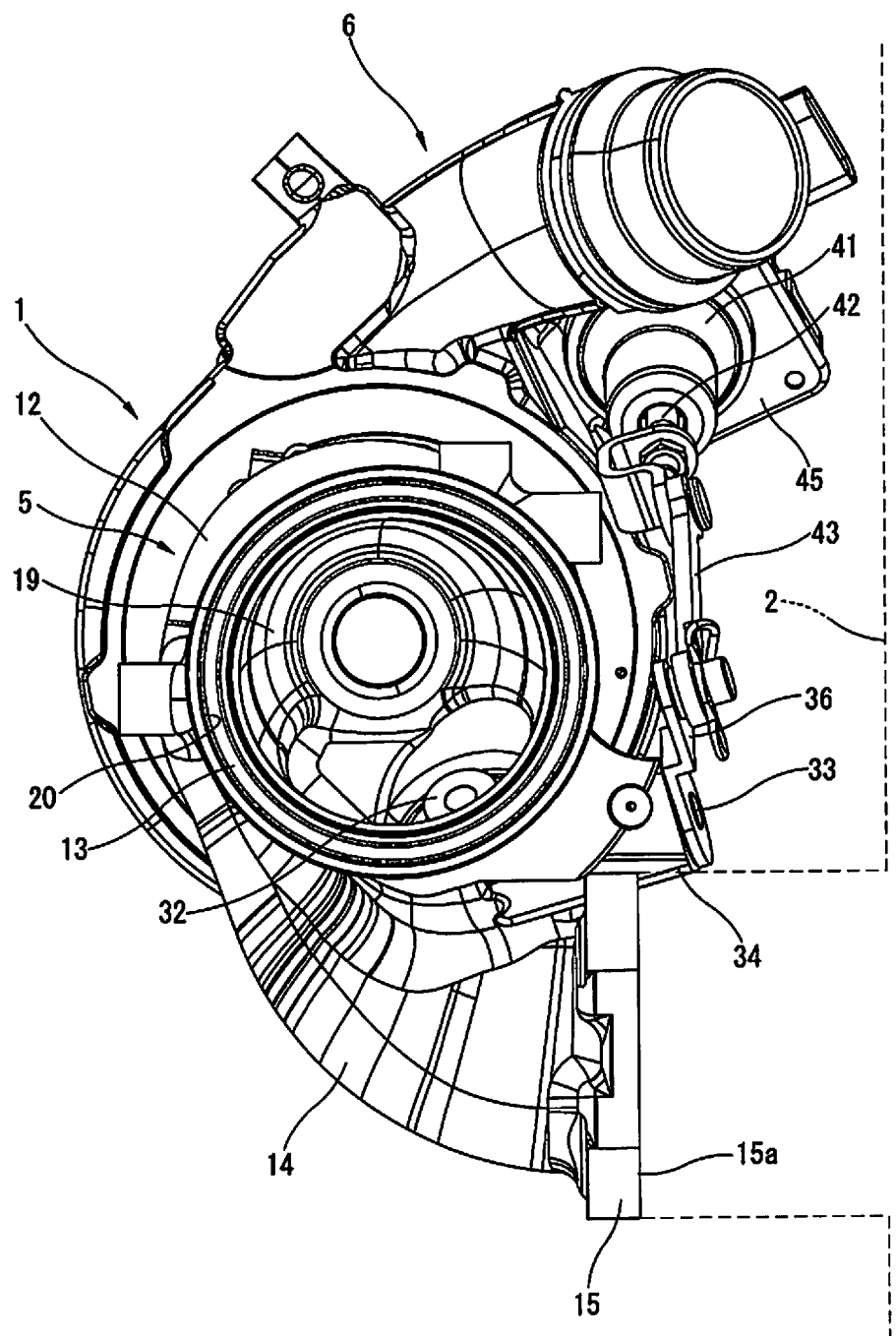
FIG. 2 is a front view of the turbocharger mounted on an internal combustion engine, viewed from an end on a turbine side.

FIGS. 1 and 2 are a side view and a front view of the overall configuration of a turbocharger 1 according to this invention. The turbocharger 1 is mounted directly on a side surface of an internal combustion engine, more specifically on a side surface of a cylinder head 2, as shown schematically in FIG. 2. FIG. 2 shows the turbocharger 1 as being mounted on the cylinder head 2 in this way. FIG. 1 is a drawing of the entire turbocharger 1 viewed from a side of the cylinder head 2.

The turbocharger 1, as is universally known, performs supercharging using exhaust energy by means of rotation of a rotor (not shown) in which a turbine wheel and a compressor wheel are coaxially connected, and the turbocharger 1 is generally divided into three sections along an axial direction of the rotor: a turbine housing 5 at one end, a compressor housing 6 at the other end, and a center housing 7 positioned therebetween, these three sections being assembled together. The compressor housing 6 and the center housing 7 are not essential parts of the present invention, and therefore shall not be described in detail.

Figure 3:
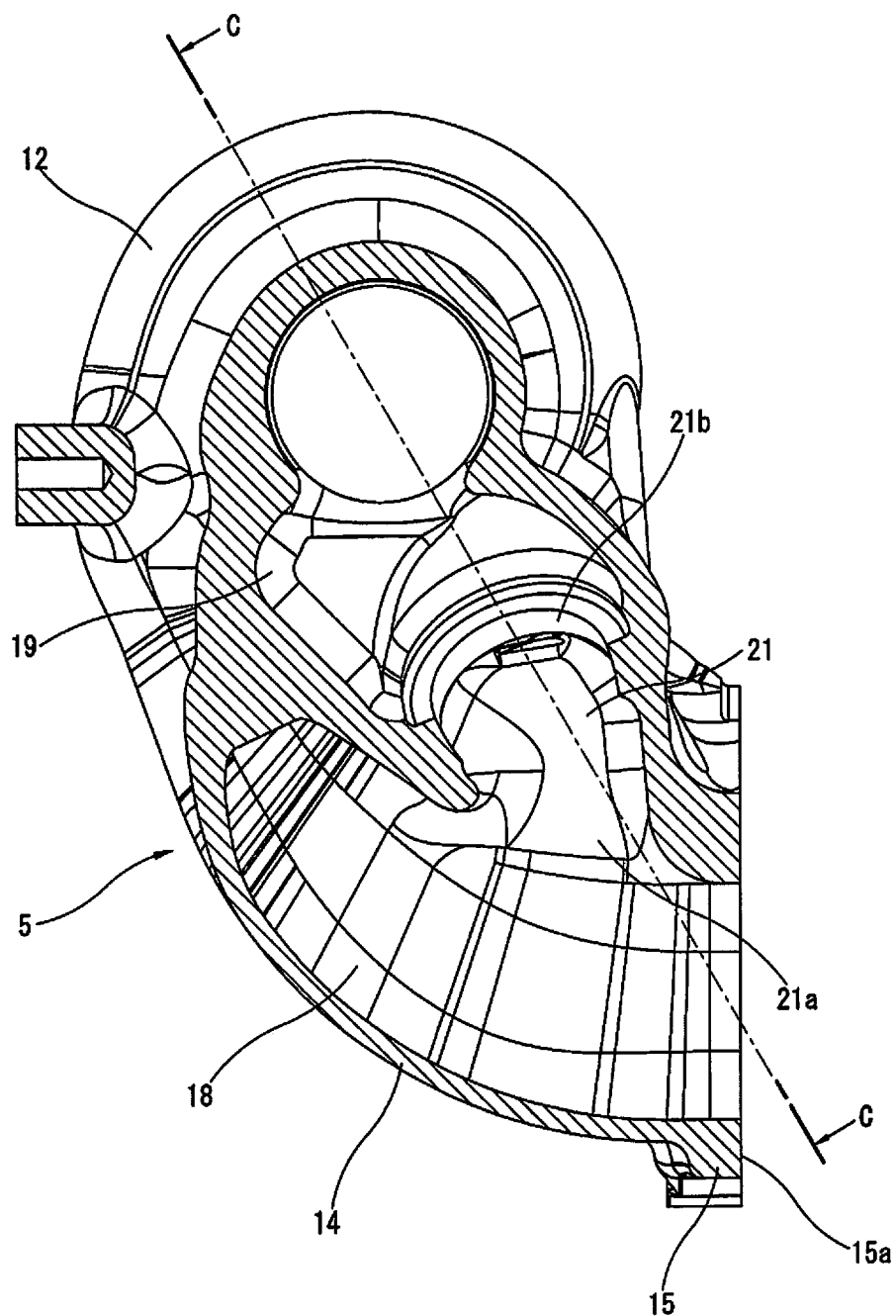
FIG. 3 is a cross-sectional view along line A-A in FIG. 1.
Figure 4:
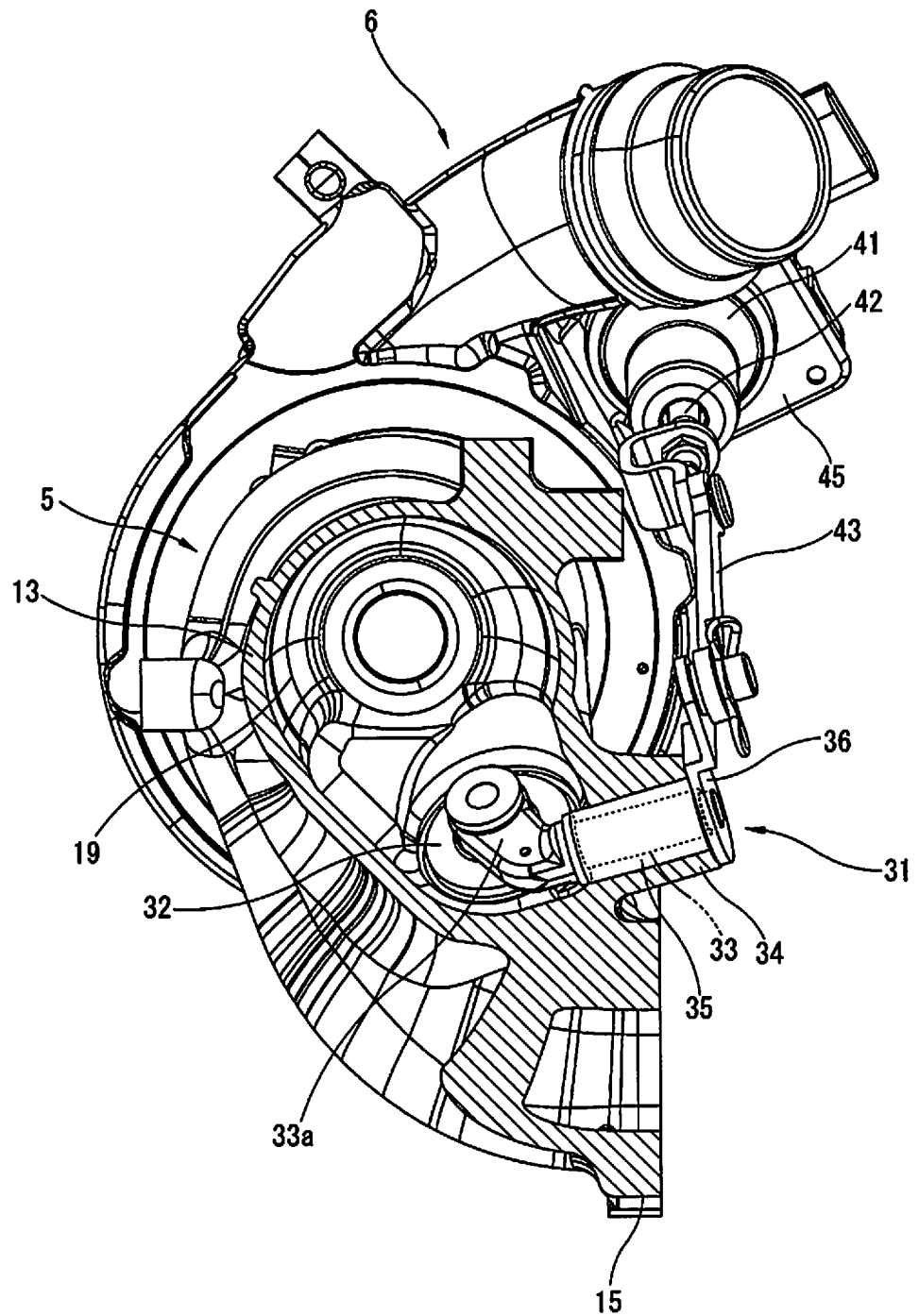
FIG. 4 is a cross-sectional view along line B-B in FIG. 1.
Figure 5:
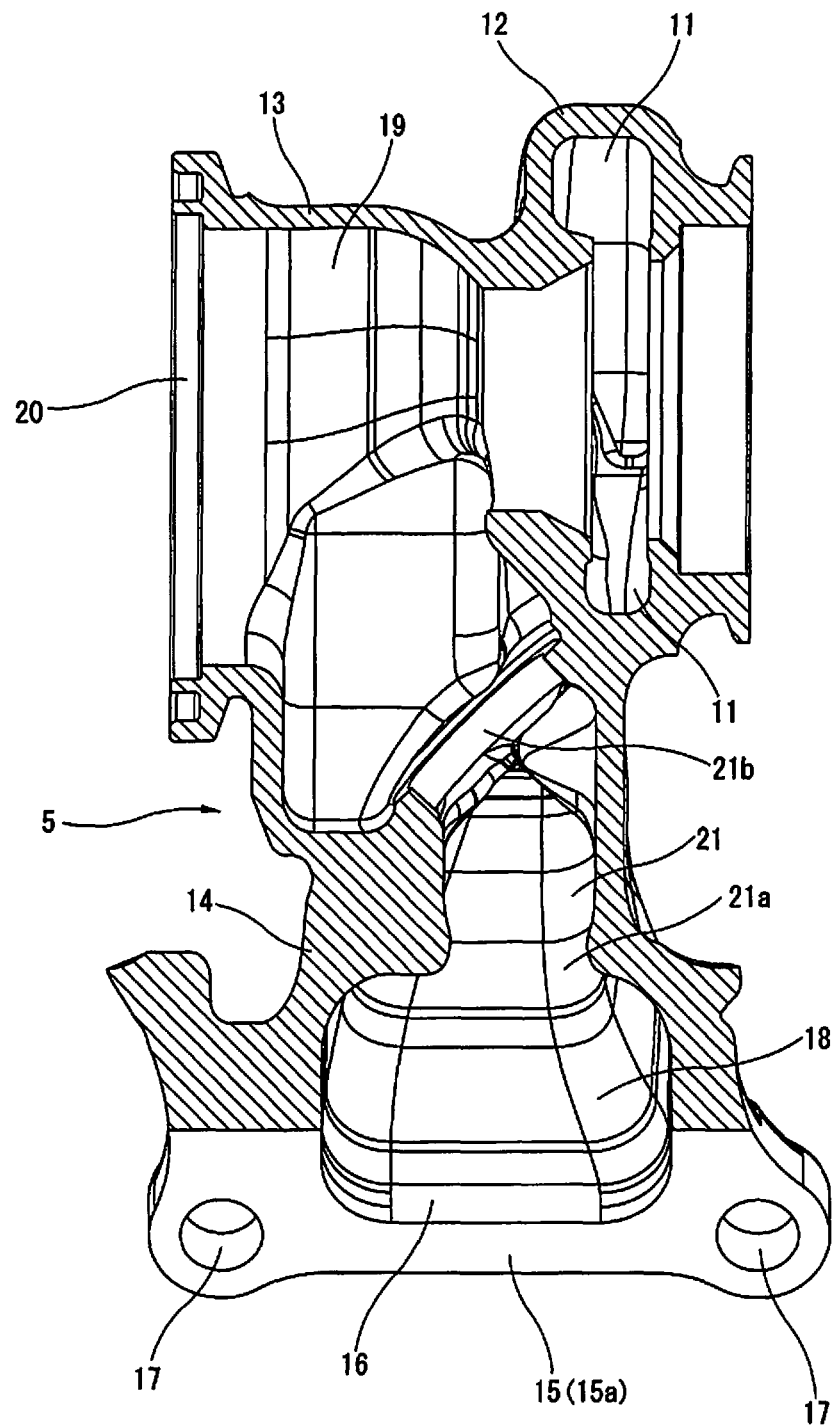
FIG. 5 is a cross-sectional view along line C-C in FIG. 3.

The turbine housing 5 comprises a heat-resistant casting made of a metal material such as stainless steel. FIGS. 3 to 5 are cross-sectional views of the turbine housing 5. Reference shall be made collectively below to these cross-sectional views. The turbine housing 5 is cast as an integrated unit from of an annular scroll part 12 forming a scroll 11 (see FIG. 5) surrounding the turbine wheel, an outlet pipe 13 extending from a center of the scroll part 12 along a rotational axis of the turbocharger 1, an inlet pipe 14 that extends along a direction that is tangent to the scroll part 12 while transitioning from the scroll part 12 in the axial direction of the rotational axis, and a mounting flange 15 at an end of the inlet pipe 14. The mounting flange 15 is formed so as to surround a substantially rectangular exhaust inlet 16 as shown in FIG. 1, and at four locations, the flange is provided with through holes 17 through which bolts are passed to mount the flange to the cylinder head 2. The mounting flange 15 is mounted on a side surface of the cylinder head 2 as shown in FIG. 2, and an exhaust outlet opening (not shown) on the cylinder head 2 side corresponds to the exhaust inlet 16 in this mounted state. In the mounted state, the mounting flange 15 is below a rotational axis of the turbine wheel. The mounting flange 15 has a mounting surface 15a along one plane.

In the inlet pipe 14 there is formed an internal inlet passage 18 having a substantially rectangular cross-sectional shape, and as shown in FIG. 3, the inlet pipe 14 extends from the mounting flange 15 to the scroll part 12 along a gentle curve, forming a twisting form as a whole. The inlet passage 18 gradually decreases in cross-sectional area, and the inlet pipe 14 merges with the scroll 11 in the scroll part 12.

The outlet pipe 13 has a substantially cylindrical bell-mouthed shape that increases in diameter axially outward, and an outlet passage 19 is formed inside the outlet pipe 13. The outlet passage 19 is configured so that after work is performed, exhaust gas flows out along the axial direction from a center of the turbine wheel, and an axial end of the outlet passage 19 opens as a circular exhaust outlet 20.

As shown in the cross-sectional views of FIGS. 3 to 5, between the inlet passage 18 and the outlet passage 19 is formed a bypass passage 21 allowing communication therebetween within the turbine housing 5. As shown in FIG. 3, the bypass passage 21 is provided on an inner peripheral side of the twisting form of a flow path from the inlet pipe 14 to the scroll part 12 when the turbine housing 5 is viewed in the axial direction. Specifically, an inlet opening 21a of the bypass passage 21 on the inlet passage 18 side opens in a wall surface that becomes a ceiling surface of the inlet passage 18 when the turbocharger 1 is in a mounted orientation shown in FIGS. 2, 3, etc. In addition, an inlet opening 21a is provided at a location directly behind the mounting flange 15 so as to be as far upstream as possible within the inlet passage 18.

An outlet opening 21b of the bypass passage 21 on the outlet passage 19 side opens in a wall surface that is a lower-surface side of the outlet passage 19 when the turbocharger 1 is in the mounted orientation shown in FIGS. 2, 3, etc. In other words, the inlet opening 21a and the outlet opening 21b of the bypass passage 21 are provided at positions adjacent to each other when the turbocharger 1 is viewed three-dimensionally. Therefore, the bypass passage 21 has a short passage length. Basically, the bypass passage 21 is placed so as to be as short as possible in a three-dimensional view. The bypass passage 21 is formed of a core when the turbine housing 5 is cast, as are the inlet passage 18 and the like.

Since the passage length of the bypass passage 21 is short, the inner wall surface of the bypass passage 21 decreases in heat-exchanging area, and any drop in temperature of exhaust flowing through the bypass passage 21 is minimized. Accordingly, there will be an improvement in, e.g., catalyst warm-up performance immediately after a cold start.

The outlet opening 21b is opened and closed by a disk-shaped valve body 32 of a waste gate valve 31 (described hereinafter), and is circular when open, in correspondence with the valve body 32. In particular, the outlet opening 21b opens obliquely toward the exhaust outlet 20 because it is necessary to machine an annular seating surface through the exhaust outlet 20 of the outlet pipe 13 after casting. In order to ensure a margin around the outlet opening 21b, a center of the circular exhaust outlet 20 is slightly offset from the rotational axis of the turbine wheel toward the outlet opening 21b (see FIG. 2).

Figure 6:
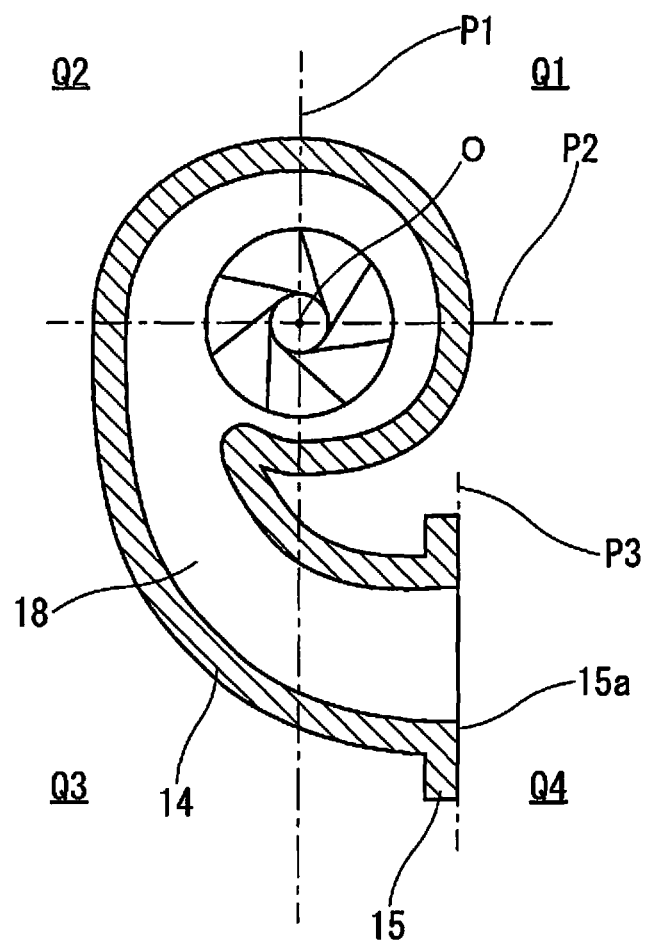
FIG. 6 is an explanatory diagram for describing a position of an outlet opening of a bypass passage.

Reference shall be made to FIG. 6 in the following. FIG. 6 schematically shows the turbine housing 5 viewed in the axial direction of the turbocharger 1, and depicts a first imaginary plane P1 that passes through a rotational center O of the turbocharger 1 and that is parallel to a surface P3 (the mounting surface 15a) of the mounting flange 15, and a second imaginary plane P2 that passes through the rotational center O and that is orthogonal to the first imaginary plane P1. An opening center of the outlet opening 21b is located in a lower right quadrant Q4 (fourth quadrant) where the mounting flange 15 is located among four quadrants Q1, Q2, Q3, and Q4 defined by these two imaginary planes P1 and P2.

As previously described, in a prior-art configuration, the opening center of the outlet opening, which is opened and closed by the valve body, is located in the third quadrant Q3 at the lower left of the diagram and the second quadrant Q2 at the upper left of the diagram. Therefore, the passage length of the bypass passage becomes long.

The waste gate valve 31, which opens and closes the bypass passage 21, includes a substantially L-shaped shaft 33 having a swing lever 33a at a tip thereof, and a disc-shaped valve body 32 attached to the tip of the swing lever 33a, as shown in FIG. 4. The shaft 33 extends outside the outlet pipe 13 through a cylindrical boss 34 cast integrally with the outlet pipe 13, and the shaft 33 is rotatably supported by the boss 34 via a cylindrical metal bush 35 serving as a bearing member. An arm 36 is fixed to an outer end of the shaft 33.

The boss 34 is provided at a part connecting between the inlet pipe 14 and the outlet pipe 13, leading from the mounting flange 15 to the scroll part 12. In other words, the boss 34 is located in a valley-form position between the two pipes. Due to the boss 34 being formed at such a location, the inlet pipe 14 and the outlet pipe 13 are interconnected by a thick part around the boss 34, and the entirety of the turbocharger 1 will have greater support rigidity when the mounting flange 15 has been mounted on an internal combustion engine. Therefore, vibration of the turbocharger 1 due to vibration of the internal combustion engine, travel vibration, and the like, is minimized.

As shown in FIG. 1, the turbocharger 1 is provided with a direct-acting electric actuator 41 as an actuator for the waste gate valve 31. The electric actuator 41 is provided with an electric motor and a ball-screw mechanism in a cylindrical casing, and is provided with a rod 42 that extends and retracts in the axial direction. A tip of the rod 42 is linked to an end of the arm 36 via a relay rod 43. When the rod 42 moves in a protruding direction, the valve body 32 opens, and when the rod 42 retracts, the valve body 32 closes. Control at an intermediate opening degree is also possible.

The electric actuator 41 is supported by a rectangular wall-form actuator-mounting flange 45 integrally formed with the compressor housing 6, and the rod 42 and the relay rod 43 extend past near outer surfaces of the center housing 7 and the turbine housing 5. When the turbocharger 1 has been mounted in an internal combustion engine as shown in FIG. 2, the electric actuator 41 comes to be located in a narrow space created between the compressor housing 6 and other components of the turbocharger 1 and the side surface of the cylinder head 2. In other words, the electric actuator 41 is placed closer to the mounting flange 15 (the first quadrant Q1 to the fourth quadrant Q4 in FIG. 6) than the first imaginary plane P1 shown in FIG. 6.

Similarly, the boss 34 of the waste gate valve 31 is also placed on a side facing the internal combustion engine as shown in FIG. 2. Specifically, the boss 34 is located in the lower right fourth quadrant Q4 in FIG. 6.

Such placement of the electric actuator 41 is suitable for the configuration of the bypass passage 21 described above, and there will be a decrease in the space substantially taken up by the entire turbocharger 1, including the electric actuator 41 when the turbocharger 1 has been mounted in an internal combustion engine. In other words, the turbocharger 1 can be made substantially smaller than when the electric actuator 41 is located on the side opposite from the internal combustion engine with the first imaginary plane P1 therebetween.

The invention claimed is:

1. A turbocharger comprising:
   a turbine housing having a bypass passage and a waste gate valve;
   a compressor housing; and
   an actuator configured to open and close the waste gate valve,
   the turbine housing including an annular scroll part forming a scroll surrounding a turbine wheel, an outlet pipe extending from a center of the scroll part along a rotational axis of the turbocharger, an inlet pipe extending along a direction that is tangent to the scroll part while transitioning from the scroll part in an axial direction of the rotational axis, and a mounting flange integrally casted at an end of the inlet pipe;
   the bypass passage being formed on an inner peripheral side of a twisting form extending from the inlet pipe to the scroll part so as to allow communication between an inlet passage inside the inlet pipe and an outlet passage inside the outlet pipe, the waste gate valve being disposed inside the outlet pipe to open and close an outlet opening of the bypass passage; and
   when viewing the turbine housing in an axial direction of the turbocharger, an opening center of the outlet opening is located in a quadrant where the mounting flange is located among first through fourth quadrants defined by a first imaginary plane that passes through a rotational center of the turbocharger and that is parallel to a surface of the mounting flange, and a second imaginary plane that passes through the rotational center and that is orthogonal to the first imaginary plane,
   the waste gate valve having a cylindrical boss formed integrally with the outlet pipe, a substantially L-shaped shaft that is rotatably supported on an inner peripheral side of the boss via a bearing member and that has a swing lever at a tip of the shaft, and a disk-shaped valve body mounted on a tip of the swing lever;
   the boss being located in the quadrant among the four quadrants where the mounting flange is located; and
   wherein the mounting flange is mounted on a side surface of a cylinder head into which an exhaust port of an internal combustion engine opens, the actuator is located between the turbine housing and the cylinder head, a body portion of the actuator is located in the first quadrant adjacent to the fourth quadrant with the second imaginary plane therebetween, and a relay rod associated with the shaft traverses between the turbine housing and the cylinder head.

2. The turbocharger according to claim 1, wherein
   the boss is provided at a part connecting the inlet pipe and the outlet pipe and extending from the mounting flange to the scroll part.

3. The turbocharger according to claim 2, wherein
   the bypass passage is formed from a location directly behind the mounting flange of the inlet pipe extending toward the outlet passage.

4. The turbocharger according to claim 1, wherein
   the bypass passage is formed from a location directly behind the mounting flange of the inlet pipe extending toward the outlet passage.

\* \* \* \* \*